(12) United States Patent
Yamine et al.

(10) Patent No.: US 11,470,492 B2
(45) Date of Patent: Oct. 11, 2022

(54) REPORTING OF PERFORMANCE DEGRADATION IN A COMMUNICATIONS SYSTEM

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 128 days.

(21) Appl. No.: 16/972,746

(22) PCT Filed: Jun. 21, 2018

(86) PCT No.: PCT/EP2018/066521
§ 371 (c)(1),
(2) Date: Dec. 7, 2020

(87) PCT Pub. No.: WO2019/242861
PCT Pub. Date: Dec. 26, 2019

(65) Prior Publication Data
US 2021/0266767 A1 Aug. 26, 2021

(51) Int. Cl.
*H04B 17/309* (2015.01)
*H04B 17/373* (2015.01)
(Continued)

(52) U.S. Cl.
CPC .......... *H04W 24/10* (2013.01); *H04B 17/309* (2015.01); *H04B 17/373* (2015.01);
(Continued)

(58) Field of Classification Search
CPC ..... H04B 17/0082–3913; H04L 5/0001–0098; H04J 11/0023–0093;
(Continued)

(56) References Cited

U.S. PATENT DOCUMENTS

2011/0276838 A1* 11/2011 Zhou .................... H04W 24/08
2011/0286356 A1 11/2011 Tenny et al.
(Continued)

FOREIGN PATENT DOCUMENTS

WO 2018065050 A1 4/2018

OTHER PUBLICATIONS

International Search Report and Written Opinion dated Oct. 16, 2018 for International Application No. PCT/EP2018/066521 filed on Jun. 21, 2018, consisting of 15-pages.
(Continued)

*Primary Examiner* — Timothy J Weidner
(74) *Attorney, Agent, or Firm* — Christopher & Weisberg, P.A.

(57) ABSTRACT

There is provided mechanisms for handling reporting of performance degradation from wireless devices in a communications system. A method is performed by a network node in the communications system. The method includes determining a configuration for real time reporting of events from wireless devices in idle mode. The events pertain to performance degradation experienced by the wireless devices when in idle mode. The configuration includes restrictions in terms of real time reporting of the events to the network node. The method includes providing information of the configuration to the wireless devices.

20 Claims, 6 Drawing Sheets

(51) Int. Cl.
*H04B 17/382* (2015.01)
*H04W 24/02* (2009.01)
*H04W 24/08* (2009.01)
*H04W 24/10* (2009.01)
*H04W 28/02* (2009.01)
*H04W 48/06* (2009.01)
*H04W 48/10* (2009.01)
*H04W 48/16* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC .......... *H04B 17/382* (2015.01); *H04W 24/02* (2013.01); *H04W 24/08* (2013.01); *H04W 28/0215* (2013.01); *H04W 28/0231* (2013.01); *H04W 28/0247* (2013.01); *H04W 48/06* (2013.01); *H04W 48/10* (2013.01); *H04W 48/16* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .......... H04J 2011/003–0096; H04W 4/30–70; H04W 8/22–245; H04W 24/02–10; H04W 28/02–26; H04W 36/0005–385; H04W 48/02–20; H04W 72/005–14; H04W 74/002–0891; H04W 84/005–22; H04W 88/005–188; H04W 92/02; H04W 92/04; H04W 92/10
See application file for complete search history.

(56) References Cited

U.S. PATENT DOCUMENTS

2012/0088457 A1* 4/2012 Johansson ............. H04W 24/10
2017/0311195 A1 10/2017 Martin et al.

OTHER PUBLICATIONS

3GPP TSG RAN meeting #80 RP-181279; Title: Enhancing LTE CA utilization; Agenda Item: 10.3.10; Source: Nokia; Document for: Status Report to TSG; Date and Location: Jun. 11-14, 2018, La Jolla, USA, consisting of 9-pages.
3GPP TSG-RAN WG2 Meeting #102 RS-1808014; Title: Resolving the remaining FFS for the euCA WID; Agenda Item:9.9.2; Source: Nokia, Nokia Shanghai Bell; WID/SID: LTE_euCA-Core-Release 15; Document for: Discussion and Decision; Date and Location: May 21-25, 2018, Busan, South Korea, consisting of 3-pages.
3GPP TS 37.320 V14.0.0; 3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall description; Stage 2 (Release 14); Mar. 2017; Valbonne, France, consisting of 26-pages.

* cited by examiner

REPORTING OF PERFORMANCE DEGRADATION IN A COMMUNICATIONS SYSTEM

CROSS-REFERENCE TO RELATED APPLICATIONS

This application is a Submission Under 35 U.S.C. § 371 for U.S. National Stage Patent Application of International Application Number: PCT/EP2018/066521, filed Jun. 21, 2018 entitled "REPORTING OF PERFORMANCE DEGRADATION IN A COMMUNICATIONS SYSTEM," the entirety of which is incorporated herein by reference.

TECHNICAL FIELD

Embodiments presented herein relate to a method, a network node, a computer program, and a computer program product for handling reporting of performance degradation from wireless devices in a communications system. Embodiments presented herein further relate to a method, a wireless device, a computer program, and a computer program product for reporting performance degradation in the communications system.

BACKGROUND

In communications systems, there may be a challenge to obtain good performance and capacity for a given communications protocol, its parameters and the physical environment in which the communications system is deployed.

For example, one parameter in providing good performance and capacity for a given communications protocol in a communications system is the ability for the communications system itself to be enabled to detect problems and automatically solve them without human intervention.

Further, it could be advantageous to detect any performance degradation as soon as possible, so that network auto-healing algorithms either solve such issue as soon as possible or try to prevent latency-sensitive applications or devices from passing through the served area suffering from performance degradation.

Some current telecommunications standards therefore allow wireless devices served in the communications system to in real time report events of performance degradation occurring in the communications system, but then only when the wireless devices are in connected mode. Thus, when in idle mode the wireless devices do not report events of performance degradation in real time. Wireless devices in idle mode might instead log any encountered events pertaining to performance degradation and then report the event later during its next connection to the network, i.e., when in connected mode. In some examples such logs can be stored up to 48 hours.

However, there is still a need for improved reporting, of performance degradation in communications systems.

SUMMARY

An object of embodiments herein is to provide efficient reporting, and handling of such reporting, of performance degradation in communications systems.

According to a first aspect there is presented a method for handling reporting of performance degradation from wireless devices in a communications system. The method is performed by a network node in the communications system. The method comprises determining a configuration for real time reporting of events from wireless devices in idle mode. The events pertain to performance degradation experienced by the wireless devices when in idle mode. The configuration comprises restrictions in terms of real time reporting of the events to the network node. The method comprises providing information of the configuration to the wireless devices.

According to a second aspect there is presented a network node for handling reporting of performance degradation from wireless devices in a communications system. The network node comprises processing circuitry. The processing circuitry is configured to cause the network node to determine a configuration for real time reporting of events from wireless devices in idle mode. The events pertain to performance degradation experienced by the wireless devices when in idle mode. The configuration comprises restrictions in terms of real time reporting of the events to the network node. The processing circuitry is configured to cause the network node to provide information of the configuration to the wireless devices.

According to a third aspect there is presented a network node for handling reporting of performance degradation from wireless devices in a communications system. The network node comprises a determine module (210a) configured to determine a configuration for real time reporting of events from wireless devices in idle mode. The events pertain to performance degradation experienced by the wireless devices when in idle mode. The configuration comprises restrictions in terms of real time reporting of the events to the network node. The network node comprises a provide module configured to provide information of the configuration to the wireless devices.

According to a fourth aspect there is presented a computer program for handling reporting of performance degradation from wireless devices in a communications system. The computer program comprises computer program code which, when run on processing circuitry of a network node, causes the network node to perform a method according to the first aspect.

According to a fifth aspect there is presented a method for reporting network performance degradation in a communications system. The method is performed by a wireless device in idle mode. The method comprises detecting occurrence of an event. The event pertains to performance degradation experienced by the wireless device when in idle mode. The method comprises reporting in real time the event to a network node in the communications system in accordance with a configuration. The configuration comprises restrictions in terms of real time reporting of events to the network node.

According to a sixth aspect there is presented a wireless device for reporting performance degradation in a communications system. The wireless device comprises processing circuitry. The processing circuitry is configured to cause the wireless device to detect occurrence of an event. The event pertains to performance degradation experienced by the wireless device when in idle mode. The processing circuitry is configured to cause the wireless device to report in real time the event to a network node in the communications system in accordance with a configuration. The configuration comprises restrictions in terms of real time reporting of events to the network node.

According to a seventh aspect there is presented a wireless device for reporting performance degradation in a communications system. The wireless device comprises a detect module configured to detect occurrence of an event. The event pertains to performance degradation experienced by the wireless device when in idle mode. The wireless device comprises a report module configured to report in real time the event to a network node in the communications system in accordance with a configuration. The configuration comprises restrictions in terms of real time reporting of events to the network node.

According to an eight aspect there is presented a computer program for reporting performance degradation in a communications system. The computer program comprises computer program code which, when run on processing circuitry of a wireless device, causes the wireless device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these wireless devices, and these computer programs provide efficient reporting, and handling of such reporting, of performance degradation in communications systems Advantageously these methods, these network nodes, these wireless devices, and these computer programs prevent multiple wireless devices from reporting in real time the same performance degradation as, for example, encountered in one and the same geographical area. In turn, this saves unnecessary signalling and processing.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown.

This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
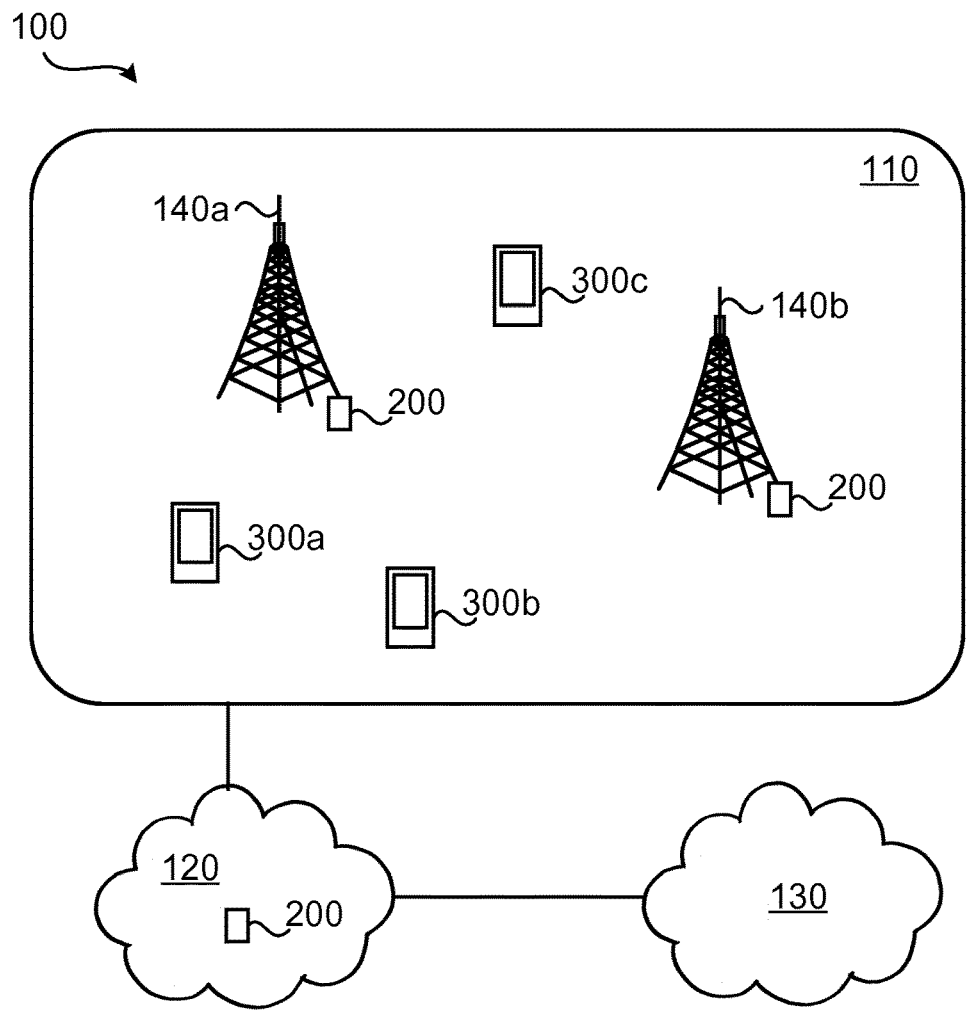
FIG. 1 is a schematic diagram illustrating a communications system according to embodiments.

FIG. 1 is a schematic diagram illustrating a communications system 100 where embodiments presented herein can be applied. The communications system 100 comprises a radio access network 110 in which radio access network nodes 140a, 140b provide network access in cells, a core network 120, and a service network 130. The radio access network nodes 140a, 140b are controlled by network nodes 200. The radio access network 110 is operatively connected to the core network 120 which in turn is operatively connected to the service network 130. The radio access network nodes 140a, 140b thereby enables wireless devices 300a, 300b, 300c to access services and exchange data as provided by the service network 130.

Examples of wireless devices 300a, 300b, 300c include, but are not limited to, mobile stations, mobile phones, handsets, wireless local loop phones, user equipment (UE), smartphones, laptop computers, tablet computers, sensors, actuators, modems, repeaters, network-equipped Internet of Things devices, and network-equipped vehicles. Examples of network nodes 200 include, but are not limited to, radio base stations, base transceiver stations, Node Bs, evolved Node Bs, gNBs, and access points. As the skilled person understands, the communications system 100 may comprise a plurality of radio access network nodes 140a, 140b, each providing network access to a plurality of wireless devices 300a, 300b, 300c, and each controlled by a network node 200. The herein disclosed embodiments are not limited to any particular number of radio access network nodes 140a, 140b, network nodes 200, or wireless devices 300a, 300b, 300c.

As disclosed above, there is still a need for improved reporting, of performance degradation in communications systems 100. Further details relating thereto will now be disclosed.

As an example, suppose in a crowded cell, as for example served by radio access network nodes 140a, that one wireless device 300a reports an event pertaining to a performance degradation at a particular location to the network node 200, for example via radio access network nodes 140b. Assume further that another wireless device 300b encounter the same performance degradation at the same particular location and also reports an event thereof to the network node 200, for example via radio access network nodes 140b. Thus, during a busy hour of the day in a crowded cell, a plurality of wireless devices 300a, 300b, 300c might report an event pertaining to the same performance degradation which, in turn, could generate a large amount of unnecessary signalling and radio resource usage and as well as excessive and unnecessary radio and processing overload at the network side in case many wireless devices 300a, 300b, 300c are reporting the same performance degradation.

The embodiments disclosed herein therefore relate to mechanisms for handling reporting of performance degradation from wireless devices 300a, 300b, 300c in a communications system 100 and for reporting performance degradation in a communications system 100. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a wireless device 300a, 300b, 300c, a method performed by the wireless device 300a, 300b, 300c, and a computer program product comprising code, for example in the form of a computer program, that when run on processing circuitry of the wireless device 300a, 300b, 300c, causes the wireless device 300a, 300b, 300c to perform the method.

Figure 2:
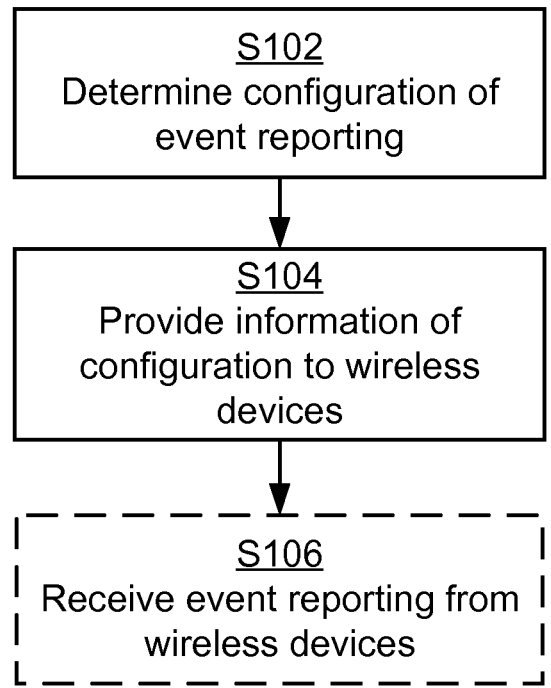
FIGS. 2, 3, 4, and 5 are flowcharts of methods according to embodiments.

Reference is now made to FIG. 2 illustrating a method for handling reporting of performance degradation from wireless devices 300a, 300b, 300c in a communications system 100 as performed by the network node 200 in the communications system 100 according to an embodiment.

In some aspects the wireless devices 300a, 300b, 300c are by the network node 200 configured how and/or when to report events pertaining to performance degradation. Particularly, the network node 200 is configured o perform step S102:

S102: The network node 200 determines a configuration for real time reporting of events from wireless devices 300a, 300b, 300c in idle mode. The events pertain to performance degradation experienced by the wireless devices 300a, 300b, 300c when in idle mode. The configuration comprises restrictions in terms of real time reporting of the events to the network node 200.

In this respect, the term real time reporting as herein used is to be interpreted as the reporting of the events being triggered and initiated by the wireless device 300a, 300b, 300c as soon as possible after the performance degradation has been experienced by the wireless device 300a, 300b, 300c, without the wireless device 300a, 300b, 300c waiting to be triggered to go from idle mode to connected mode for any other reason, such as for initiating or receiving a call.

The configuration is then provided to the wireless devices 300a, 300b, 300c. Particularly, the network node 200 is configured to perform step S104:

S104: The network node 200 provides information of the configuration to the wireless devices 300a, 300b, 300c.

Embodiments relating to further details of handling reporting of performance degradation from wireless devices 300a, 300b, 300c in a communications system 100 as performed by the network node 200 will now be disclosed.

Once the wireless devices 300a, 300b, 300c have been provided with the configuration it might be assumed that the wireless devices 300a, 300b, 300c follow the configuration when reporting events to the network node 200. Hence, according to an embodiment the network node 200 is configured to perform (optional) step S106:

S106: The network node 200 receives, in conformity with the configuration, reporting of events from the wireless devices 300a, 300b, 300c.

There could be different ways for the network node 200 to act once having received reportings of events from the wireless devices 300a, 300b, 300c.

In some aspects the reception of the reporting triggers the network node 200 to forward the reporting of the event to another network node or to an operations support systems (OSS). The other network node or the OSS might then initiate auto-healing. The OSS might therefore be configured to determine what type of auto-healing to perform, and to determine which entities in the communications system 100 that should be subjected to auto-healing. Further, what type of auto-healing to perform depends on what type of performance degradation the event pertains to. Auto-healing algorithms are as such known by the skilled person and further description thereof is therefore omitted.

In some aspects the reception of the reporting triggers the network node 200 to enforce even more restricted reporting of events from the wireless devices 300a, 300b, 300c. Further details thereof will be disclosed below.

There could be different types of configurations. Different aspects relating thereto will now be disclosed.

In some aspects the configuration is defined by a set of rules defining restrictions in terms of real time reporting of the events to the network node 200. There could be different examples of such rules.

In some aspects, the configuration pertains to network awareness of the performance degradation, where one rule thus could specify the reporting to either be on or off, and where the reporting is off if the network has already determined the existence of the performance degradation or has already received a certain number of reports of such, or similar, events).

That is, according to an embodiment, according to the configuration, the wireless devices 300a, 300b, 300c are not to report those events to the network node 200 that the network node 200 already has received N reportings of, where N≥1 is an integer. Thereby, after a certain number of event reportings have been received from one or more wireless device 300a, 300b, 300c, wherein the events pertain to the same or similar type of performance degradation, the network might, by means of providing the configuration to the wireless devices 300a, 300b, 300c, instruct the wireless devices 300a, 300b, 300c to stop reporting such events.

In some aspects the rules are based on any one or more of: the time of the day, day of the week or month, week, month, year, etc. (e.g., where the event reporting is configured to be on only during working hours (e.g. between 9:00 AM to 5:00 PM), during working days (e.g. between Monday and Friday), during working periods (e.g. from September to July). That is, according to an embodiment, according to the configuration, the wireless devices 300a, 300b, 300c are restricted to only report events during a specified period per day.

In some aspects the rules are based on the current network load, or resource utilization, as experienced by, or as reported to, the network node 200.

Rules based on general network load (e.g., the reporting is ON if the UL network load or resource utilization is below 40%, otherwise it is OFF)

That is, according to an embodiment, according to the configuration, the wireless devices 300a, 300b, 300c are restricted to not report events when network load of the network node 200 is above a threshold load level. As a non-limiting illustrative example, the network node 200 could configure the wireless devices 300a, 300b, 300c to report events only when the current network load, or resource utilization, as experienced by, or as reported to, the network node 200 is below the threshold load level, for example below 40% or the like.

In some aspects the rules are based on the current location of the wireless devices 300a, 300b, 300c. That is, according to an embodiment, according to the configuration, the wireless devices 300a, 300b, 300c are restricted to not report events when located at a particular location.

The network node 200 might thereby notify all the wireless devices 300a, 300b, 300c served by a radio access network node 140a in a certain cell to stop reporting the same event or any event related to the same particular location, whilst allowing they the wireless devices 300a, 300b, 300c to report any events pertaining to performance degradation in any other location of the same cell.

There could be different types of locations. According to an embodiment the particular location is given at cell level or at finer level than cell level, and wherein how the network node 200 reacts to reporting of events from the wireless devices 200 depends on at what level of detail the particular location is given. Thereby, only wireless devices 300a, 300b, 300c in a certain location (or outside such a certain location), such as tracking area/cell/cell portion/geographical location determined by a coordinates and/or environment type such as indoor/outdoor might be configured to report events).

Further, the reporting of events in a certain location might be switched off for some wireless devices but switched on for some specific wireless devices configured to report events for such a certain location places but not in for other locations.

In some aspects the network node 200 classifies the reporting of the performance degradations into at least two categories; at cell level, and at some specific location within a cell. Then, the network node 200 might treat the reportings of events differently depending on which if the at least two categories the reporting belongs to.

As an example, if the event is classified as pertaining to performance degradation at cell level, after a certain number of reportings of the same event has been reported, the network node 200 could inform all the wireless devices 300a, 300b, 300c in the cell to stop reporting events by means of broadcasting a parameter in the system Information of the cell.

As an example, if the event is classified as pertaining to performance degradation at a specific location within a cell, the network node might request the wireless devices 300a, 300b, 300c to not to report any events of performance degradation that occurs at this specific location, the network node 200 could broadcast, in addition to the type of performance degradation, the specific location(s) for which events are not to be reported.

In this respect, the network node 200 might be configured to count the number of reportings it has received for an event at each such specific location or area within the cell during a certain time period in order to determine whether or not to restrict reporting of events for a specific location within the cell. Additionally or alternatively, the network node 200 might be configured to restrict the reporting in the specific location within the cell as soon as one single reporting of an event has been received for this specific location. Some examples of the specific location or area within the cell are a cell portion, the area of one or more cells, tracking area, an area determined by geographical coordinated or address, one or more buildings, a floor in a building, an office, etc.

In some aspects the rules are based on the age of the issue causing the performance degradation to be reported as an event. That is, according to an embodiment, according to the configuration, the wireless devices 300a, 300b, 300c are restricted to report events only within a threshold time interval from occurrence of the events. As a non-limiting example, the configuration might specify that the wireless devices 300a, 300b, 300c are not to report events of performance degradation older than the threshold time interval. That is, if a wireless device 300a, 300b, 300c has not been able to report an event within the threshold time interval, the reporting of that event is dropped.

In some aspects the rules are based on the issue type, i.e., what caused the performance degradation. That is, according to an embodiment, according to the configuration, the wireless devices 300a, 300b, 300c are restricted to not report events of at least one particular event type.

In some aspects the rules are based on the type and/or category of the wireless devices 300a, 300b, 300c. That is, according to an embodiment, according to the configuration, wireless devices 300a, 300b, 300c of at least one particular device type are restricted to not report events. As a non-limiting example, only wireless devices 300a, 300b, 300c of a certain type or category might be allowed to report events during a certain time of the day.

In some aspects the rules pertain to at least two different levels of detail of the reportings. Hence, according to an embodiment the configuration specifies at least two levels of detail for the reporting, and wherein the wireless devices 300a, 300b, 300c are restricted in terms of which level of detail to use for the reporting.

In this respect, the rules might specify that the reporting of the events should be binary (e.g. specifying the presence of an event by setting a binary "1" in a certain field in a message sent towards the network node 200 and else setting a binary "0" in this certain field). Further in this respect, the configuration might specify that the reporting of the event is to include location information of the performance degradation. Further in this respect, the configuration might specify that the reporting of the event is to include a level of severity, or importance, of the event (e.g., low, medium, high, etc.). Further in this respect, the configuration might specify that the reporting of the event is to include absolute or relative measurements, where the relative might be with respect to a reference or a threshold, such as a drop or an excess compared to what is considered to be a normal value, or level, of the quantity that is measured). The measurements might be radio measurements or sensor measurements.

In some aspects, the rules specify that which level of detail to use depends on the network load. Particularly, according to an embodiment, which level of detail the wireless devices 300a, 300b, 300c are restricted to depends on network load of the network node 200. That is, according to a non-limiting example, any performance degradation might be allowed to be reported as an event only when the network load is below a first threshold, but only critical performance degradations might be allowed to be reported when the network load is above the first threshold, but below a second threshold, where the second threshold is above the first threshold. In this respect, the network node 200 might thus be configured to monitor its network load, either at tracking area level, cell level or at different locations within the cell. The latter might require the wireless devices 300a, 300b, 300c to also report location information together with the reporting of the event, or that the network node 200 otherwise estimates the location of the wireless devices 300a, 300b, 300c within the cell, such that the network node 200 could keep track of the network load at specific locations within the cell as needed.

As a non-limiting example, the rules might specify that the wireless devices 300a, 300b, 300c are to report events at a low level of detail when the network load is above the first threshold and below the second threshold but at a high level of details at a second load only when the network load is below the first threshold. This could efficiently control, or limit, the overhead signalling needed for the reporting of events when the network load is already high.

Further, the rules might specify that the wireless devices 300a, 300b, 300c are to report events using different means of signalling for the respective different levels of detail. For example, the configuration might specify that, when the network load is above the first threshold and below the second threshold, events are to be reported via random access (e.g., a so-called msg3 or using a specific random access sequence or preamble dedicated for event reporting), and, when the network load is below the first threshold, events are to be reported via radio resource control signalling.

Particularly, according to an embodiment, each level of detail is associated with its own way of signalling for providing the reporting to the network node 200.

In some aspects, a high level of detail for reporting the event is used only after a reporting of the event has been made at a low level of detail, for example only upon a request from the network node 200. Particularly, according to an embodiment the wireless devices 300a, 300b, 300c are restricted to only use highest level of detail for the reporting upon request from the network node 200.

In some aspects, the configuration specifies a combination of at least two rules for reporting events.

In some aspects, while the above disclosed rules themselves are fixed, there could be different triggers for when a certain rule is to be applied, enabling dynamic application of the rules. As a non-limiting and illustrative example, the current network load of the network node 200 could act as a trigger as to whether a certain rule is to be applied or not. In general terms, the higher the network load is, the more restricting the event reporting should be. In this respect, at a first level of network load the network node 200 might signal to the wireless devices 300a, 30b, 300c, or otherwise inform the wireless devices 300a, 30b, 300c about the configuration as defined by the rules to be applied at this first level of network load. Then, when the network load changes to a second level of network load the network node 200 might signal to the wireless devices 300a, 30b, 300c, or otherwise inform the wireless devices 300a, 30b, 300c about the configuration as defined by the rules to be applied at this second level of network load. Thereby, more and more of the rules might be triggered to be applied as the network load of the network node 200 increases. That is, the event reporting might be more restricted at 60% network load than at 40% network load, and even more restricted at 80% network load, and so on. This could even further efficiently control, or limit, the overhead signalling needed for the reporting of events.

There could be different ways to provide the configuration to the wireless devices 300a, 300b, 300c, as in step S106.

In some aspects the wireless devices 300a, 300b, 300c are explicitly provided with the rules themselves. Particularly, according to an embodiment the information of the configuration as provided to the wireless devices 300a, 300b, 300c is the configuration itself. The network node 200 might thus configure one or more of the above-disclosed rules by explicitly notifying the wireless devices 300a, 300b, 300c of the rules in step S106.

In some aspects the wireless devices 300a, 300b, 300c are implicitly provided with the rules by only being notified as to whether the reporting of events is to be on or off. Particularly, according to an embodiment the information of the configuration as provided to the wireless devices 300a, 300b, 300c only specifies whether the wireless devices 300a, 300b, 300c are to report the events or not. The network node 200 might thereby implement the rules without explicitly providing the configuration to the wireless devices 300a, 300b, 300c.

Different types of signalling can be used for providing the information of the configuration to the wireless devices 300a, 300b, 300c. Particularly, according to an embodiment the information of the configuration is provided using broadcast signalling towards the wireless devices 300a, 300b, 300c, multicast signalling towards the wireless devices 300a, 300b, 300c, or dedicated signalling, such as radio resource control (RRC) signalling, towards the wireless devices 300a, 300b, 300c.

There could be different types of performance degradations that are reported as events. Some examples have already been disclosed above. Further in this respect, the radio measurements might be reports of single strength such as RSRP, or reports of signal quality such as RSRQ or SINR, etc. as measured by the wireless devices 300a, 300b, 300c, or reports of lost connection or link failure, such as radio link failure. Hence, according to an embodiment the event pertains to at least one radio condition, such as signal quality or signal strength, as experienced by the wireless devices 300a, 300b, 300c, being below a threshold value. Further in this respect, the sensor measurements might be reports of air pollution, atmosphere temperature; pressure, etc., or statistics thereof over some time interval (e.g., average, variance, minimum, maximum, difference with respect to a reference value, difference between the minimum and maximum, etc.).

Figure 3:
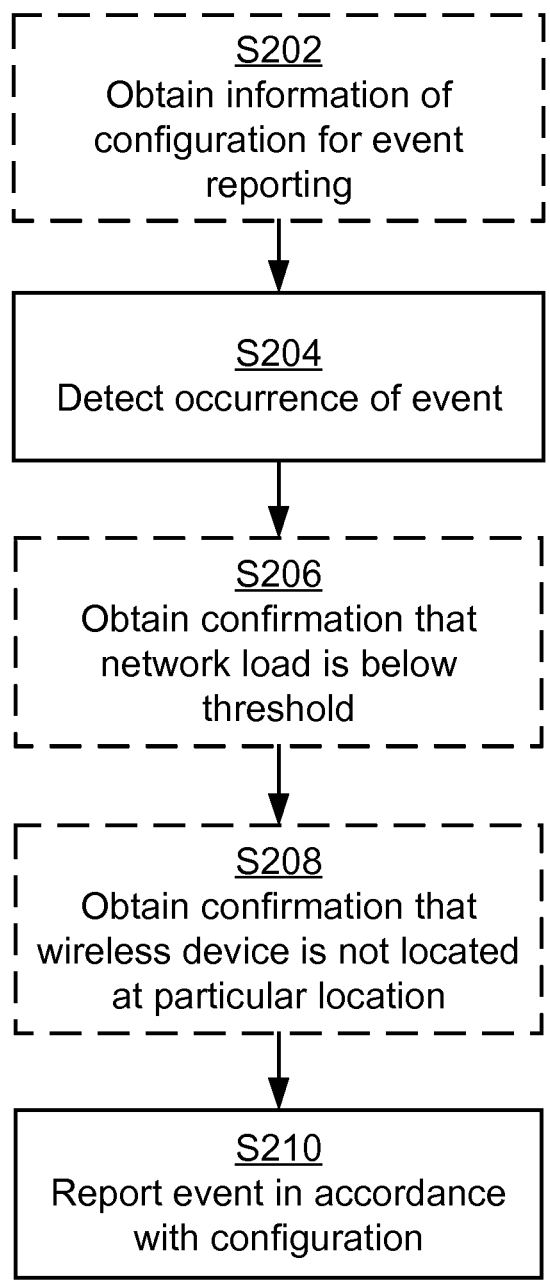

Reference is now made to FIG. 3 illustrating a method for reporting performance degradation in a communications system 100 as performed by the wireless device 300a, 300b, 300c in idle mode according to an embodiment.

It is assumed that the wireless device 300a, 300b, 300c in idle mode detects a performance degradation. Particularly the wireless device 300a, 300b, 300c is configured to perform step S204:

S204: The wireless device 300a, 300b, 300c detects occurrence of an event. The event pertaining to performance degradation experienced by the wireless device 300a, 300b, 300c when in idle mode.

It is further assumed that the wireless device 300a, 300b, 300c reports the event to the network. Particularly the wireless device 300a, 300b, 300c is configured to perform step S210:

S210: The wireless device 300a, 300b, 300c reports in real time the event to the network node 200 in the communications system 100 in accordance with a configuration. The configuration comprises restrictions in terms of real time reporting of events to the network node 200.

Embodiments relating to further details of reporting performance degradation in a communications system 100 as performed by the wireless device 300a, 300b, 300c will now be disclosed.

There could be different ways for the wireless device 300a, 300b, 300c to obtain the configuration. Different embodiments relating thereto will now be described in turn.

In some aspects the configuration is obtained from the network node 220. Hence, according to an embodiment the wireless device 300a, 300b, 300c is configured to perform (optional) step S202:

S202: The wireless device 300a, 300b, 300c obtains information of the configuration from the network node 200 prior to reporting the event.

How the network node 200 might provide the configuration to the wireless device 300a, 300b, 300c has been disclosed above.

In some aspects the wireless device is preconfigured with the configuration. Hence, according to an embodiment the configuration is preconfigured in the wireless device 300a, 300b, 300c. Further in this respect, the configuration might be pre-defined or configured within the subscriber identity module of the wireless device 300a, 300b, 300c.

Further in this respect, the wireless device 300a, 300b, 300c might be configured with one or more rules to be used by the wireless device 300a, 300b, 300c when deciding how, or even if, to report the event to the network node 200. The wireless device 300a, 300b, 300c receiving such a rule could then, upon having detected occurrence of an event (as in step S204) evaluate the rule and adapts its reporting (as in in step S210) of the event accordingly. For evaluating the rules, the wireless device 300a, 300b, 300c might need to determine, or extract, information relevant for a certain rule (e.g., time of day, location of the wireless device 300a, 300b, 300c, category of the wireless device 300a, 300b, 300c, etc.), evaluate, measure (e.g., load based on interference measurements such as RSRQ, RSSI, etc.) or calculate (e.g., percentage or some statistics, etc.) one or more metrics which are defined in the rule.

As disclosed above, there could be different types of configurations. Different aspects relating thereto have also been disclosed above and apply also to embodiments relating to the wireless device 300a, 300b, 300c.

As disclosed above, according to an embodiment, according to the configuration, the wireless device 300a, 300b, 300c is restricted to only report events during a specified period per day.

As disclosed above, according to an embodiment, according to the configuration, the wireless device 300a, 300b, 300c is restricted to not report events when network load of the network node 200 is above a threshold load level. The wireless device 300a, 300b, 300c is then configured to perform (optional) step S206:

S206: The wireless device 300a, 300b, 300c obtains confirmation that the network load is not above the threshold load level when the event is to be reported.

As disclosed above, according to an embodiment, according to the configuration, the wireless device 300a, 300b, 300c is restricted to not report events when located at a particular location. The wireless device 300a, 300b, 300c is then configured to perform (optional) step S208:

S208: The wireless device 300a, 300b, 300c obtains confirmation that the wireless device 300a, 300b, 300c is not located at the particular location when the event is to be reported.

As disclosed above, according to an embodiment, according to the configuration, the wireless device 300a, 300b, 300c is restricted to report events only within a threshold time interval from occurrence of the events. The wireless device 300a, 300b, 300c might thus be configured to, at time of determining whether, and if so how, to report the event, evaluate how long duration in time has passed since detecting the occurrence of the events.

As disclosed above, according to an embodiment, according to the configuration, the wireless device 300a, 300b, 300c is restricted to not report events of at least one particular event type. The wireless device 300a, 300b, 300c might thus be configured to, at time of determining whether, and if so how, to report the event, evaluate of what type the event is.

As disclosed above, according to an embodiment, according to the configuration, the wireless device 300a, 300b, 300c is restricted to not report events when the wireless device 300a, 300b, 300c is of at least one particular device type. The wireless device 300a, 300b, 300c might thus be configured to, at time of determining whether, and if so how, to report the event, access information about what device type the wireless device 300a, 300b, 300c is.

In this respect, if the wireless device 300a, 300b, 300c detects occurrence of an event, then if the wireless device 300a, 300b, 300c detects another occurrence of the same event, or event the same occurrence of the same event, after few seconds or minutes, the wireless device 300a, 300b, 300c might, according to the configuration, be restricted as to not report another event thereof as the event is considered to already reported.

Further in this respect, if the wireless device 300a, 300b, 300c, once an event has been reported, an accelerometer, positioning system (such as GPS or the like), or any other movement detection mechanism, might be triggered in order evaluate how far the wireless device 300a, 300b, 300c has moved between two consecutive event reportings. This could enable the wireless device 300a, 300b, 300c to not report performance degradation occurring at the same location more than once.

As disclosed above, according to an embodiment, the configuration specifies at least two levels of detail for the reporting, and wherein the wireless device 300a, 300b, 300c is restricted in terms of which level of detail to use for the reporting. The wireless device 300a, 300b, 300c might thus be configured to, at time of determining whether, and if so how, to evaluate which level of detail to use for the reporting.

As disclosed above, according to an embodiment, which level of detail the wireless device 300a, 300b, 300c is restricted to depends on network load of the network node 200. The wireless device 300a, 300b, 300c might thus be configured to obtain information indicative of the network load of the network node 200

As disclosed above, according to an embodiment, each level of detail is associated with its own way of signalling for providing the reporting to the network node 200. The wireless device 300a, 300b, 300c might thus be configured to, at time of determining whether, and if so how, to evaluate which way of signalling to use for providing the reporting to the network node 200.

As disclosed above, according to an embodiment, the wireless device 300a, 300b, 300c is restricted to only use highest level of detail for the reporting upon request from the network node 200. The wireless device 300a, 300b, 300c might thus be configured to, at time of determining whether, and if so how, to evaluate whether or not it has received such a request.

As disclosed above, there could be different ways to provide the configuration to the wireless devices 300a, 300b, 300c and hence different ways for the wireless devices 300a, 300b, 300c to obtain the information of the configuration. According to an embodiment, the information of the configuration as obtained from the network node 200 is the configuration itself. According to an embodiment, the information of the configuration as obtained from the network node 200 only specifies whether the wireless device 300a, 300b, 300c is to report the events or not.

As disclosed above, there could be different types of signalling that can be used for providing the information of the configuration to the wireless devices 300a, 300b, 300c (when information of the configuration is obtained from the network node 200). According to an embodiment the information of the configuration is obtained in broadcast signalling from the network node 200, in multicast signalling from the network node 200, or in dedicated signalling from the network node 200.

Examples of events that are reported have been disclosed above and are equally applicable with respect to methods performed b the wireless device 300a, 300b, 300c.

Figure 4:
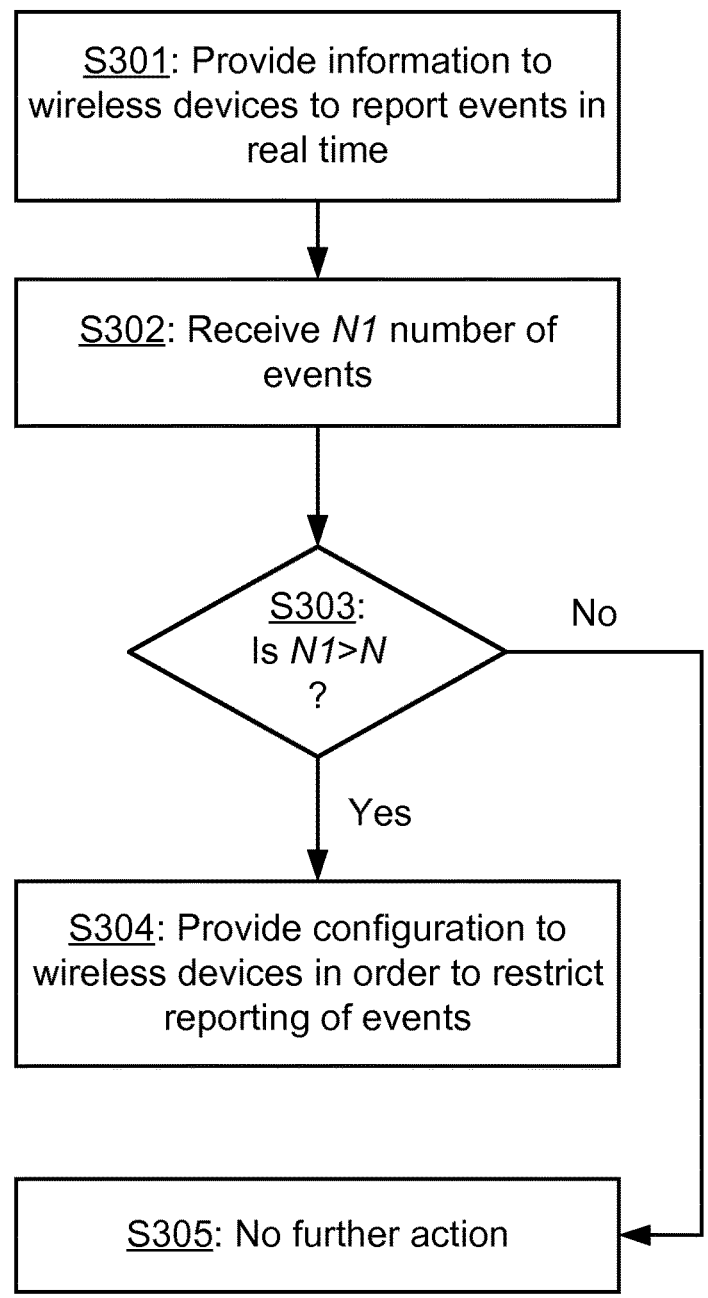

One particular embodiment for handling reporting of performance degradation from wireless devices 300a, 300b, 300c in a communications system 100 as performed by the network node 200 based on at least some of the above disclosed embodiments will now be disclosed in detail with reference to the flowchart of FIG. 4.

S301: The network node 200 provides information to all wireless devices 300a, 300b, 300c to in real time report, to the network node 200, any performance degradation.

S302: The network node 200 receives Ni number of event reports from the wireless devices 300a, 300b, 300c located a particular location of a particular cell in the communications system 100.

S303: The network node 200 checks if Ni is larger than a threshold value N. If yes, step S304 is entered. If no, step S305 is entered.

S304: The network node 200 provides configuration to all wireless devices 300a, 300b, 300c at the particular location to restrict reporting of events so as to not report events of the particular location, but to keep reporting events at other locations in the communications system 100.

S305: No further action is taken by the network nodes 200 in terms of handling reporting of performance degradation from the wireless devices 300a, 300b, 300c.

Figure 5:
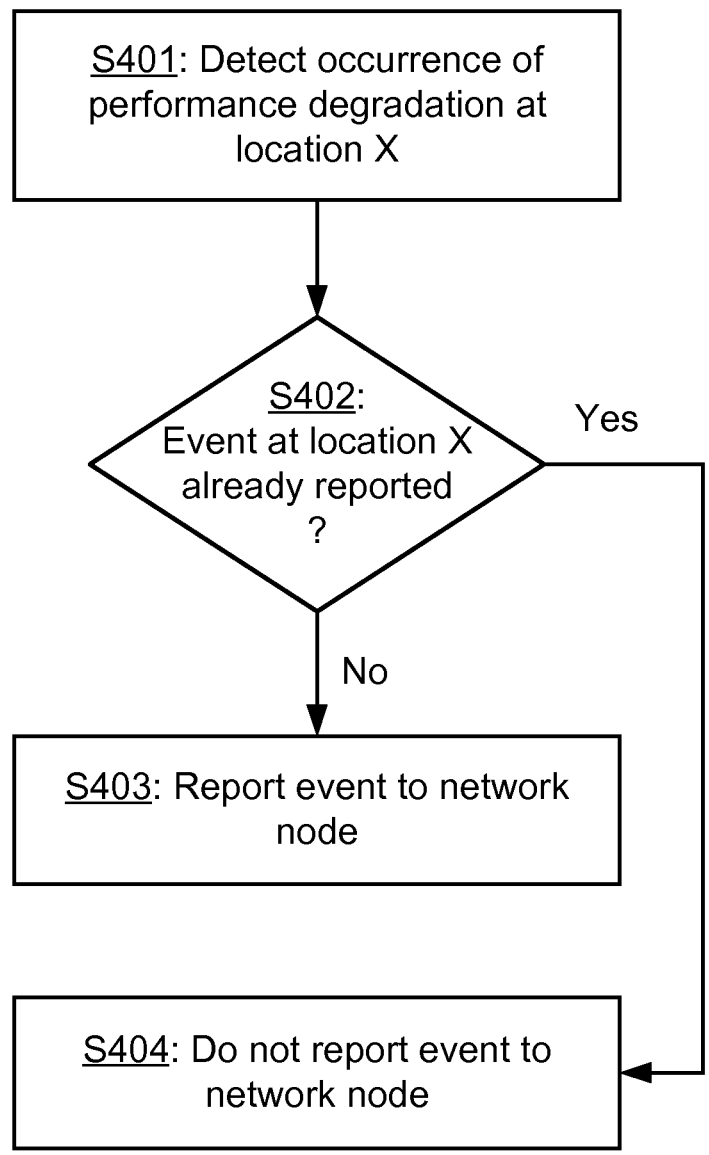

One particular embodiment for reporting network performance degradation in a communications system 100 as performed by a wireless device 300a, 300b, 300c in idle mode based on at least some of the above disclosed embodiments will now be disclosed in detail with reference to the flowchart of FIG. 5.

S401: The wireless device 300a, 300b, 300c detects occurrence of an event pertaining to performance degradation experienced by the wireless device 300a, 300b, 300c at a particular location.

S402: The wireless device 300a, 300b, 300c checks if the wireless device 300a, 300b, 300c has already reported an event for this performance degradation. The check might be based on using information from a movement detection mechanism of the wireless device 300a, 300b, 300c and/or timing information.

If no, step S403 is entered. If yes, step S404 is entered.

S403: The wireless device 300a, 300b, 300c reports the event to the network node 200.

S404: The wireless device 300a, 300b, 300c does not report the event to the network node 200.

Figure 6:
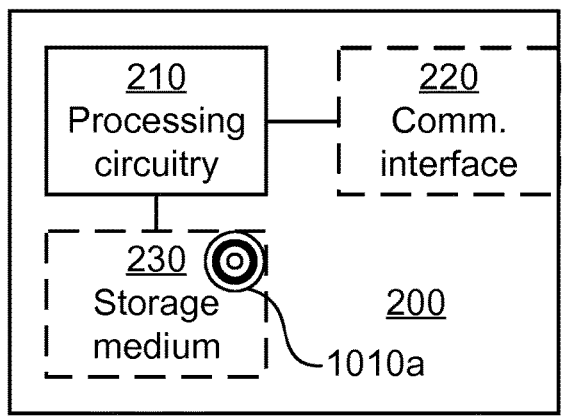
FIG. 6 is a schematic diagram showing functional units of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, functions, and devices of the communications system 100. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 7:
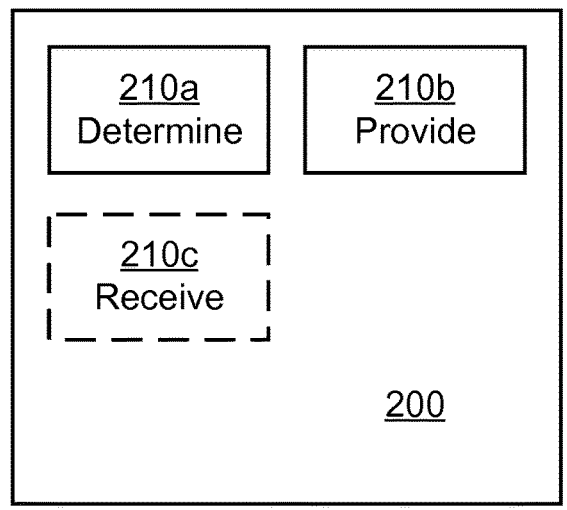
FIG. 7 is a schematic diagram showing functional modules of a network node according to an embodiment.

FIG. 7 schematically illustrates, in terms of a number of functional modules, the components of a network node 200 according to an embodiment. The network node 200 of FIG. 7 comprises a number of functional modules; a determine module 210a configured to perform step S102 and a provide module 210b configured to perform step S104. The network node 200 of FIG. 7 may further comprise a number of optional functional modules, such as a receive module 210c configured to perform step S106. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the network node 200 as disclosed herein.

Examples of network nodes 200 have been given above.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Figure 8:
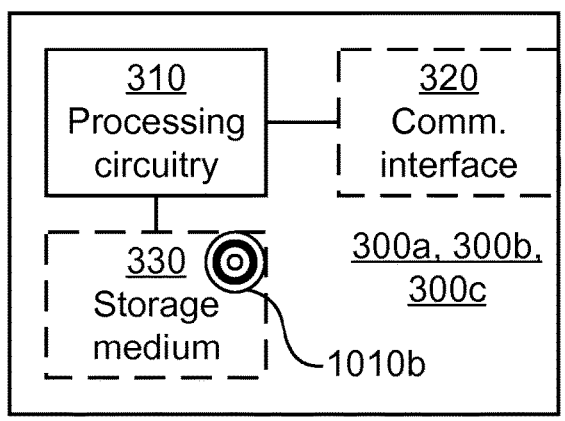
FIG. 8 is a schematic diagram showing functional units of a wireless device according to an embodiment.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210, 310 is illustrated in FIGS. 6 and 8 the processing circuitry 210, 310 may be distributed among a plurality of devices, or nodes. The same applies to the functional modules 210a-210c of FIG. 7 and the computer program 1020a of FIG. 10.

FIG. 8 schematically illustrates, in terms of a number of functional units, the components of a wireless device 300a, 300b, 300c according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a, 300b, 300c to perform a set of operations, or steps, as disclosed above. For example, the storage medium 330 may store the set of operations, and the processing circuitry 310 may be configured to retrieve the set of operations from the storage medium 330 to cause the wireless device 300a, 300b, 300c to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a, 300b, 300c may further comprise a communications interface 320 for communications with other entities, nodes, functions, and devices of the communications system 100. As such the communications interface 320 may comprise one or more transmitters and receivers, comprising analogue and digital components.

The processing circuitry 310 controls the general operation of the wireless device 300a, 300b, 300c e.g. by sending data and control signals to the communications interface 320 and the storage medium 330, by receiving data and reports from the communications interface 320, and by retrieving data and instructions from the storage medium 330. Other components, as well as the related functionality, of the wireless device 300a, 300b, 300c are omitted in order not to obscure the concepts presented herein.

Figure 9:
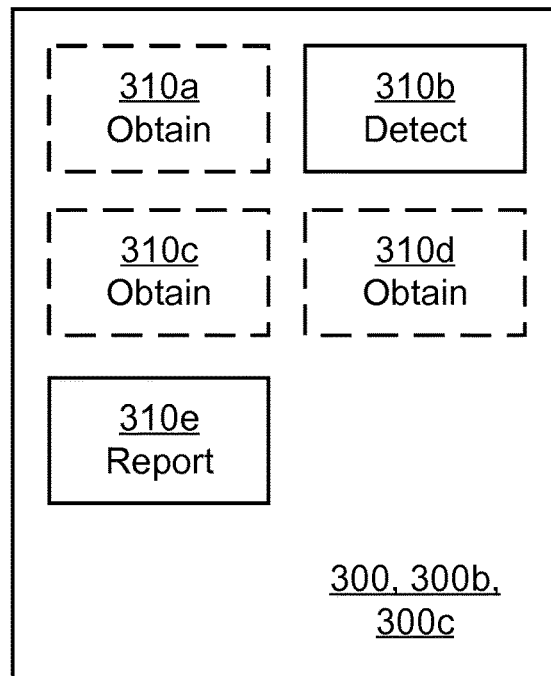
FIG. 9 is a schematic diagram showing functional modules of a wireless device according to an embodiment.

FIG. 9 schematically illustrates, in terms of a number of functional modules, the components of a wireless device 300a, 300b, 300c according to an embodiment. The wireless device 300a, 300b, 300c of FIG. 9 comprises a number of functional modules; a detect module 310b configured to perform step S204 and a report module 310e configured to perform step S210. The wireless device 300a, 300b, 300c of FIG. 9 may further comprise a number of optional functional modules, such as any of a first obtain module 310a configured to perform step S202, a second obtain module 310c configured to perform step S206, and a third obtain module 310d configured to perform step S208. In general terms, each functional module 310a-310e may be implemented in hardware or in software. Preferably, one or more or all functional modules 310a-310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310e and to execute these instructions, thereby performing any steps of the wireless device 300a, 300b, 300c as disclosed herein.

Examples of wireless devices 300a, 300b, 300c have been given above.

Figure 10:
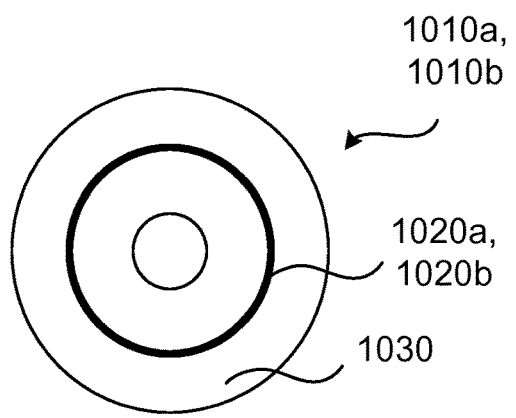
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the wireless device 300a, 300b, 300c as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling reporting of performance degradation from wireless devices in a communications system, the method being performed by a network node in the communications system, the method comprising:
determining a configuration for real time reporting of events from wireless devices in idle mode, the events pertaining to performance degradation experienced by the wireless devices when in idle mode, the configuration comprising restrictions in terms of real time reporting of the events to the network node;
providing information of the configuration to the wireless devices; and
receiving, in conformity with the configuration, reporting of events from the wireless devices and, according to the configuration, the wireless devices not reporting those events to the network node that the network node already has received N reportings of, where N≥1 is an integer.

2. The method according to claim 1, wherein, according to the configuration, the wireless devices are restricted to only report events during a specified period per day.

3. The method according to claim 1, wherein, according to the configuration, the wireless devices are restricted to not report events when network load of the network node is above a threshold load level.

4. The method according to claim 1, wherein, according to the configuration, the wireless devices are restricted to not report events when located at a particular location or within a certain area.

5. The method according to claim 4, wherein the particular location is given at one of a tracking area level, a cell level and at a finer level than cell level, and wherein how the network node reacts to reporting of events from the wireless devices depends on at what level of detail the particular location is given.

6. The method according to claim 1, wherein, according to the configuration, wireless devices are restricted to not report events of at least one particular event type.

7. The method according to claim 1, wherein, according to the configuration, wireless devices of at least one particular device type are restricted to not report events.

8. The method according to claim 1, wherein the configuration specifies at least two levels of detail for the reporting, and wherein the wireless devices are restricted in terms of which level of detail to use for the reporting.

9. The method according to claim 8, wherein which level of detail the wireless devices are restricted to depends on network load of the network node.

10. A method for reporting network performance degradation in a communications system, the method being performed by a wireless device in idle mode, the method comprising:
    detecting occurrence of an event, the event pertaining to performance degradation experienced by the wireless device when in idle mode;
        obtaining information of the configuration from the network node prior to reporting the event; and
        reporting in real time the event to a network node in the communications system in accordance with a configuration, wherein the configuration comprises restrictions in terms of real time reporting of events to the network node, events being reported via one of random access and resource control signalling and, according to the configuration, the wireless device not reporting those events to the network node that the network node already has received N reportings of, where $N \geq 1$ is an integer.

11. The method according to claim 10, wherein, according to the configuration, the wireless device is restricted to only report events during a specified period per day.

12. The method according to claim 10, wherein, according to the configuration, the wireless device is restricted to not report events when network load of the network node is above a threshold load level, the method further comprising:
    obtaining confirmation that the network load is not above the threshold load level when the event is to be reported.

13. The method according to claim 10, wherein, according to the configuration, the wireless device is restricted to not report events when located at a particular location or within a certain area, the method further comprising:
    obtaining confirmation that the wireless device is not located at the particular location when the event is to be reported.

14. The method according to claim 10, wherein, according to the configuration, the wireless device is restricted to report events only within a threshold time interval from occurrence of the events.

15. The method according to claim 10, wherein, according to the configuration, the wireless device is restricted to not report events of at least one particular event type.

16. The method according to claim 10, wherein, according to the configuration, the wireless device is restricted to not report events when the wireless device is of at least one particular device type.

17. The method according to claim 10, wherein the configuration specifies at least two levels of detail for the reporting, and wherein the wireless device is restricted in terms of which level of detail to use for the reporting.

18. The method according to claim 17, wherein which level of detail the wireless device is restricted to depends on network load of the network node.

19. A network node for handling reporting of performance degradation from wireless devices in a communications system, the network node comprising processing circuitry, the processing circuitry being configured to cause the network node to:
    determine a configuration for real time reporting of events from wireless devices in idle mode, the events pertaining to performance degradation experienced by the wireless devices when in idle mode, the configuration comprising restrictions in terms of real time reporting of the events to the network node;
    provide information of the configuration to the wireless devices; and
    receive, in conformity with the configuration, reporting of events from the wireless devices and, according to the configuration, the wireless devices not reporting those events to the network node that the network node already has received N reportings of, where $N \geq 1$ is an integer.

20. A wireless device for reporting performance degradation in a communications system, the wireless device comprising processing circuitry, the processing circuitry being configured to cause the wireless device to:
    detect occurrence of an event, the event pertaining to performance degradation experienced by the wireless device when in idle mode;
        obtain information of the configuration from the network node prior to reporting the event; and
    report in real time the event to a network node in the communications system in accordance with a configuration, the configuration comprising restrictions in terms of real time reporting of events to the network node, and according to the configuration, the wireless device not reporting those events to the network node that the network node already has received N reportings of, where $N \geq 1$ is an integer.

* * * * *